(12) United States Patent
Lee et al.

(10) Patent No.: US 9,046,716 B2
(45) Date of Patent: Jun. 2, 2015

(54) DEVICE FOR SUPPORTING SUBSTRATE AND EXAMINER FOR SEAL PATTERN OF LCD CELL USING THE SAME

(75) Inventors: Hyoung Bae Lee, Incheon (KR); Yong Chul Oh, Hwaseoung-si (KR)

(73) Assignee: SNU PRECISION CO. LTD., Seoul (KR)

( * ) Notice: Subject to any disclaimer, the term of this patent is extended or adjusted under 35 U.S.C. 154(b) by 1293 days.

(21) Appl. No.: 12/523,972

(22) PCT Filed: Mar. 19, 2008

(86) PCT No.: PCT/KR2008/001540
§ 371 (c)(1),
(2), (4) Date: Jul. 21, 2009

(87) PCT Pub. No.: WO2008/117953
PCT Pub. Date: Oct. 2, 2008

(65) Prior Publication Data
US 2009/0318051 A1     Dec. 24, 2009

(30) Foreign Application Priority Data

Mar. 28, 2007 (KR) .................. 10-2007-0030438

(51) Int. Cl.
*B05C 13/00* (2006.01)
*B23Q 3/08* (2006.01)
*G02F 1/1339* (2006.01)

(52) U.S. Cl.
CPC .............. *G02F 1/1339* (2013.01); *B05C 13/00* (2013.01)

(58) Field of Classification Search
None
See application file for complete search history.

(56) References Cited

U.S. PATENT DOCUMENTS

| 2,045,876 | A | * | 6/1936 | Schwab et al. ............... 118/255 |
| 4,656,951 | A | * | 4/1987 | Kimura et al. ................ 108/20 |
| 4,865,491 | A | * | 9/1989 | Sakurai ........................ 406/87 |
| 4,910,549 | A | * | 3/1990 | Sugita ........................ 355/53 |
| 5,246,331 | A | * | 9/1993 | Hallahan et al. ............. 414/676 |
| 5,537,186 | A |   | 7/1996 | Korenaga et al. |

(Continued)

FOREIGN PATENT DOCUMENTS

JP   2003344486 A    12/2003
JP     16212976 A     7/2004

(Continued)

OTHER PUBLICATIONS

Yukihiro, JP 2002-346452, Abstract, English Translation, Original document.*

*Primary Examiner* — Charles Capozzi
(74) *Attorney, Agent, or Firm* — Volpe and Koenig, P.C.

(57) ABSTRACT

Disclosed are a substrate support apparatus and an apparatus for examining the seal pattern of an LCD cell. The substrate support apparatus includes a movable stage provided with drawing nozzles for attaching a substrate to an upper surface and adapted to rotate by a predetermined angle; a fixed stage spaced from the movable stage and provided with floating nozzles for ejecting air upward and drawing nozzles for drawing air downward; and a driving device coupled to the movable stage to rotate the movable stage. The apparatus for examining the seal pattern of an LCD cell includes the substrate support apparatus; and a gantry unit including support platforms positioned on both sides of the substrate support apparatus, a bridge positioned above the substrate support apparatus to connect the support platforms, and a correction device coupled to the bridge to examine and repair a seal pattern of a substrate.

4 Claims, 10 Drawing Sheets

(56) References Cited

U.S. PATENT DOCUMENTS

| | | | | |
|---|---|---|---|---|
| 5,660,381 | A | * | 8/1997 | Suzuki ............................ 269/73 |
| 6,164,633 | A | * | 12/2000 | Mulligan et al. ................ 269/21 |
| 6,781,684 | B1 | * | 8/2004 | Ekhoff ....................... 356/237.1 |
| 7,753,629 | B1 | * | 7/2010 | McCulloch .................... 409/224 |
| 2005/0151151 | A1 | * | 7/2005 | Hawtof et al. ................. 257/100 |
| 2006/0124003 | A1 | * | 6/2006 | Sakaida et al. ................ 101/123 |
| 2007/0137558 | A1 | * | 6/2007 | Holm et al. ................... 118/213 |

FOREIGN PATENT DOCUMENTS

| KR | 1020010112467 A | 12/2001 |
|---|---|---|
| KR | 1020050024957 A | 3/2005 |
| KR | 1020050105795 A | 11/2005 |

\* cited by examiner

DEVICE FOR SUPPORTING SUBSTRATE AND EXAMINER FOR SEAL PATTERN OF LCD CELL USING THE SAME

TECHNICAL FIELD

The present invention relates to an apparatus for supporting or aligning substrates or various types of panels when they are examined. More particularly, the present invention relates to an apparatus for supporting or aligning substrates or various types of panels by using a fixed stage and a movable stage separate from the fixed stage and adapted to rotate.

BACKGROUND ART

As generally known in the art, transferable conveyer belts or other transfer means are used to transfer substrates between respective processes for manufacturing various types of circuit boards or panels. In addition, various means are used to accurately position the transferred substrates before each process starts.

The accurate positioning of substrates has higher importance in the case of processes for manufacturing semiconductors or LCD panels, which require a high level of precision. As used herein, an LCD (Liquid Crystal Display) refers to a device for displaying images, which includes two substrates facing each other and having their own electrodes, and liquid crystals injected between both substrates so that, when a voltage is applied to both electrodes, the resulting electric field moves the liquid crystal molecules and varies the transmittance of light.

Processes for manufacturing a liquid crystal panel (also referred to as cell processes) will now be described briefly.

The cell processes include an orientation process for orienting liquid crystals in a direction with regard to an array substrate, on which thin film transistors are arranged, and a color filter substrate, on which color filters are formed; a cell gap forming process for bonding both substrates to each other to maintain a predetermined gap; a cell cutting process; and a liquid crystal injection process.

Each cell process will be described in more detail with reference to FIG. 1.

In the first process, i.e. in the orientation film forming process, the array substrate, which has thin film transistors arranged for respective pixels, and the color filter substrate, which has red, green, and blue color filters formed to correspond to respective pixels of the array substrate, are coated with polyimide, which is a type of polymer, to form an orientation film (s1). A roll coating method is commonly used to print a polyimide orientation film of a uniform thickness in a predetermined pattern on the entire surface of the array substrate and the color filter substrate. Then, both substrates are subjected to preliminary drying and baking processes to harden the orientation film.

The upper and lower substrates, which have a hardened orientation film formed thereon, proceed to the second cell process, i.e. rubbing process (s2). The surface of the hardened orientation film is rubbed against a rubbing cloth at constant pressure and rate to align the polymer chains on the surface in a predetermined direction. The rubbing process is an importance process for determining the initial direction of arrangement of liquid crystals and guaranteeing that they are driven normally and are endowed with uniform display characteristics.

After the rubbing process is over, both substrates are subjected to the third step, i.e. processes for forming a seal pattern, applying silver (Ag), and scattering spacers (s3). The lower substrate, i.e. the array substrate, is subjected to the seal pattern forming and silver application processes, while the upper substrate, i.e. the color filter substrate, is subjected to the spacer scattering process. Alternatively, the color filter substrate is subjected to the seal pattern forming and silver application processes, while the array substrate is subjected to the spacer scattering process. The seal pattern of a liquid crystal panel has the role of forming a gap into which liquid crystals are injected, as well as the role of preventing the injected liquid crystals from leaking. In the seal pattern forming process, sealant (a type of thermosetting resin) is used to form a desired pattern on the edge of the substrate according to a screen mask method, which employs a seal screen printing device, or a dispenser method, which employs a seal dispensing device. The dispenser method has recently gained popularity in line with the current trends toward larger substrates.

After the seal pattern has been formed, the array substrate (color filter substrate) is subjected to the silver application process. In this process, a predetermined amount of silver (Ag) paste is applied at predetermined points on the array substrate for electric conductance between the upper and lower substrates.

While the array substrate (color filter substrate) undergoes the seal pattern forming and silver application processes, the color filter substrate (array substrate) is subjected to the spacer scattering process for scattering ball spacers at a uniform density throughout the entire surface of the substrate so that a cell gap is formed in the active region. Methods for scattering spacers include a dry-type method and a wet-type method. The dry method electrically charges spacers so that they are scattered without clumping together, and is used more often than the latter. It has been recently proposed to form patterned spacers at a predetermined interval on the color filter substrate, while the substrate is manufactured, to maintain a cell gap. In this case, the spacer scattering process is omitted.

After the array substrate (or color filter substrate) has undergone the seal pattern forming and silver application processes, and after the color filter substrate (or array substrate) has undergone the spacer scattering process, the fourth process, i.e. bonding process, starts (s4).

In order to bond the array substrate and the color filter substrate to each other, the color filter pattern of the upper substrate must be accurately aligned with the pixels of the lower substrate (bonding alignment). The degree of bonding alignment is determined based on the margin set for each substrate during design. The bonding margin depends on the extent to which the black matrix on the color filter substrate overlaps the pixel electrodes on the array substrate, and a precision level of a number of micrometers is required. If the bonding alignment of both substrates lies out of the error range, light leaks out. This means that, when the liquid crystal cells are driven, desired screen quality cannot be obtained. After the bonding alignment, the upper and lower substrates are bonded to each other to obtain a circular panel. Even pressure is applied to the circular panel concurrently application of heat to the seal pattern so that the cell gap remains constant and that the seal pattern is hardened.

The circular panel is then cut in the following cell cutting process (s5). In this process, the circular panel created through the preceding steps is cut into unit cells. The cell cutting process includes a scribing process for marking a cutting line on the surface of the circular panel by using a cutting wheel made of diamond or hard metal, the hardness of which is higher than glass substrates, and a breaking process for applying force to the cutting line to break the panel.

The liquid crystal panel, which has been cut into unit cells through the cutting process, is subjected to a liquid crystal injection process (s6). In this process, the interior of the liquid crystal panel, which has a cell gap of a number of micrometers, is vacuumized, and liquid crystals are injected into the liquid crystal panel by using the capillary phenomenon and the difference relative to the atmospheric pressure. After the liquid crystal injection is over, the injection hole is sealed by sealant, which is then irradiated with UV rays for hardening.

Then, shorting bars on the pad of the liquid crystal panel are removed in a grinding process, and the liquid crystal panel is examined to confirm whether it is qualified or not (s7). This completes the processes for manufacturing the liquid crystal panel.

Recent LCD cells, which are manufactured through the above-mentioned processes, tend to have a combination of at least two models of seal patterns 2 and 3 with different sizes in the same substrate 1, as shown in FIG. 2, in connection with the current trends toward larger substrates 1. More particularly, a large model seal pattern 2 is formed as a main pattern for increasing the efficiency in using the area of the substrate 1, and a medium or small model seal pattern 3 is formed in the remaining region.

A seal dispenser device is used to examine and repair such a substrate, which has a seal pattern 2 formed thereon. FIG. 3 partially shows a seal dispenser device including a seal dispenser.

As shown in FIG. 3, an array substrate 1, on which seal patterns 2 and 3 are to be formed, is positioned on a stage 4 of the seal dispenser device 7. Then, the seal dispenser 5, which is positioned above the stage 4 and which is filled with sealant, is aligned and positioned to start forming seal patterns 2 and 3. Based on a program regarding the shape of seal patterns, which has been inputted to the seal dispenser device 7, seal patterns 2 and 3 are formed along the edge of the substrate 1.

The seal dispenser device 7 is equipped with a camera 6 for checking disconnection of the seal patterns 2 and 3 formed on the substrate 1 and measuring their line width. Therefore, after the seal patterns 2 and 3 have been formed, the camera 6 moves along the seal patterns 2 and 3 to check disconnection. If a number of points have been designated in different positions according to respective models, the camera 6 measures the line width of the seal patterns 2 and 3.

Data regarding acceptable line widths of the seal patterns 2 and 3 for respective models has been inputted to the seal dispenser device 7, and is compared with the measured line width data. If the result of comparison lies out of the error range, the alarm is raised, for example, to inform that the formed seal patterns 2 and 3 are defective.

If the seal patterns 2 and 3 have disconnection, liquid crystals may leak after the bonding. If the line width of the seal patterns lies out of the error range, the amount of injected liquid crystals varies, and so does the cell gap. As a result, the thickness of liquid crystals becomes uneven, and the display quality degrades.

As such, the examination and repair processes are very important, and the alignment of the substrate 1 is crucial to the improvement of examination precision.

However, as substrates or panels tend to become larger, it has become increasingly difficult to position the substrate 1, which is transferred by a robot arm and seated on the stage 4, at the accurate alignment point. This necessitates either adjustment of the stage 4 or meticulous adjustment of the large substrate by an adjustment means. However, either case requires a large amount of power. Furthermore, adjustment of the entire substrate 1 takes a long period of time, and lengthens the overall process time.

DISCLOSURE OF INVENTION

Technical Problem

Therefore, the present invention has been made in view of the above-mentioned problems, and the present invention provides an apparatus capable of easily aligning a substrate by using separate stages, on which the substrate can be placed.

The present invention also provides a substrate support apparatus capable for aligning a substrate with a small amount of power.

The present invention also provides a substrate alignment apparatus having a structure simple enough to maximize the efficiency of utilizing the working space.

The present invention also provides an apparatus capable of aligning a substrate within a short period of time and reducing the overall process time.

The present invention also provides an apparatus capable of reducing the overall process time and decreasing the process cost.

Technical Solution

In accordance with an aspect of the present invention, there is provided a substrate support apparatus for seating and supporting a substrate during a process, the substrate support apparatus including a movable stage provided with drawing nozzles for attaching a substrate to an upper surface and adapted to rotate by a predetermined angle; a fixed stage spaced from the movable stage and provided with floating nozzles for ejecting air upward and drawing nozzles for drawing air downward; and a driving means coupled to one side of the movable stage to rotate the movable stage.

Preferably, the driving means includes a driving motor, a feed shaft coupled to the driving motor, a movable body coupled to the feed shaft and adapted to move in a longitudinal direction of the feed shaft, and a sliding roller coupled to the movable body, and the movable stage includes a protrusion having an insertion groove formed to receive the sliding roller, so that the movable stage is rotated by driving force from the driving means.

Preferably, the movable stage includes a guide positioned on a bottom surface to guide rotation of the movable stage. This facilitates rotation of the movable stage.

According to another aspect of the present invention, there is provided an apparatus for examining a seal pattern of an LCD cell, the apparatus including the substrate support apparatus; and a gantry unit including support platforms positioned on both sides of the substrate support apparatus, a bridge positioned above the substrate support apparatus to connect the support platforms, and a correction device coupled to the bridge to examine and repair a seal pattern of a substrate. This guarantees easy alignment of the substrate.

Advantageous Effects

The substrate support apparatus according to the present invention and the apparatus for examining the seal pattern of an LCD cell by using the same are advantageous in that a substrate can be easily aligned by using separate stages, on which the substrate can be seated.

The alignment of a substrate by using separate stages alone consumes a small amount of power.

The separate stages are moved by a dedicated power source. This simplifies the structure for aligning substrates.

The separate stages alone are adjusted to align a substrate for a short period of time. This reduces the overall process time.

The reduction in the process time decreases the process cost.

BRIEF DESCRIPTION OF THE DRAWINGS

The foregoing and other objects, features, and advantages of the present invention will become more apparent from the following detailed description when taken in conjunction with the accompanying drawings in which.

BEST MODE FOR CARRYING OUT THE INVENTION

Hereinafter, exemplary embodiments of the present invention will be described with reference to the accompanying drawings.

Mode for the Invention

Figure 1:
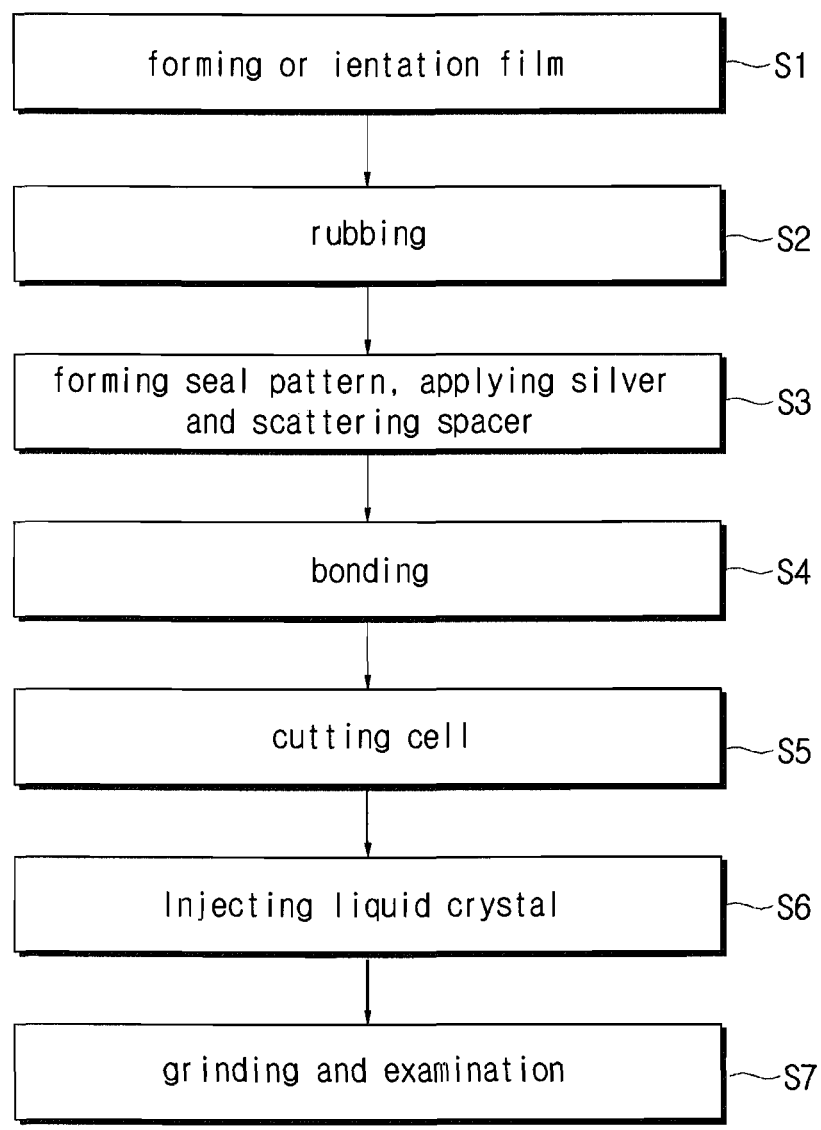
FIG. 1 shows LCD cell processes.
Figure 2:
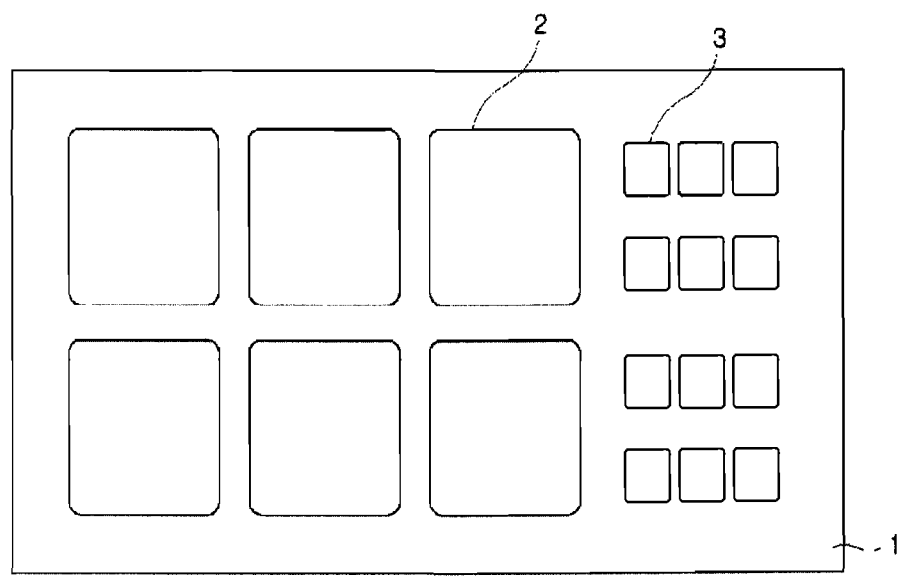
FIG. 2 is a top view of a large LCD substrate.
Figure 3:
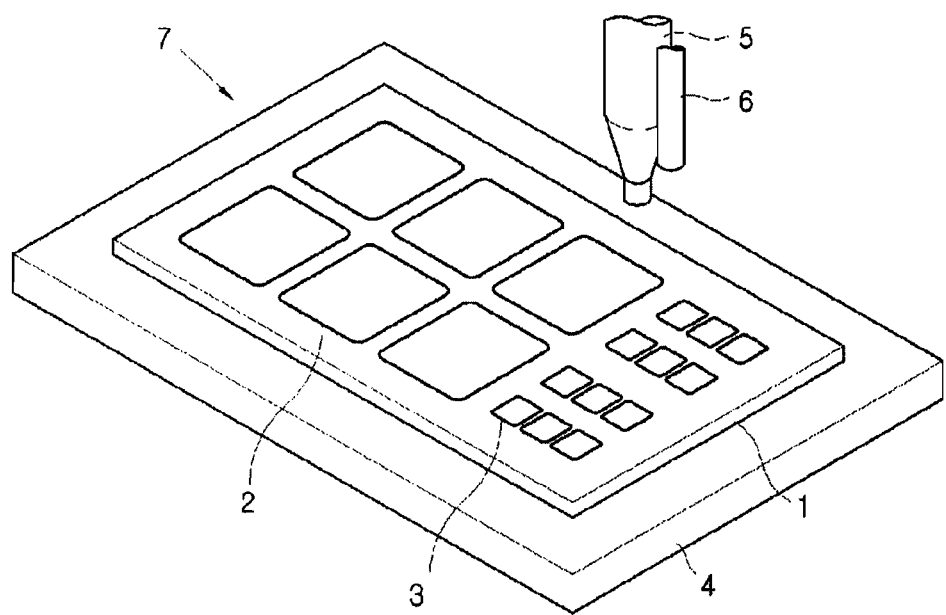
FIG. 3 shows an apparatus for examining large LCD substrates.
Figure 4:
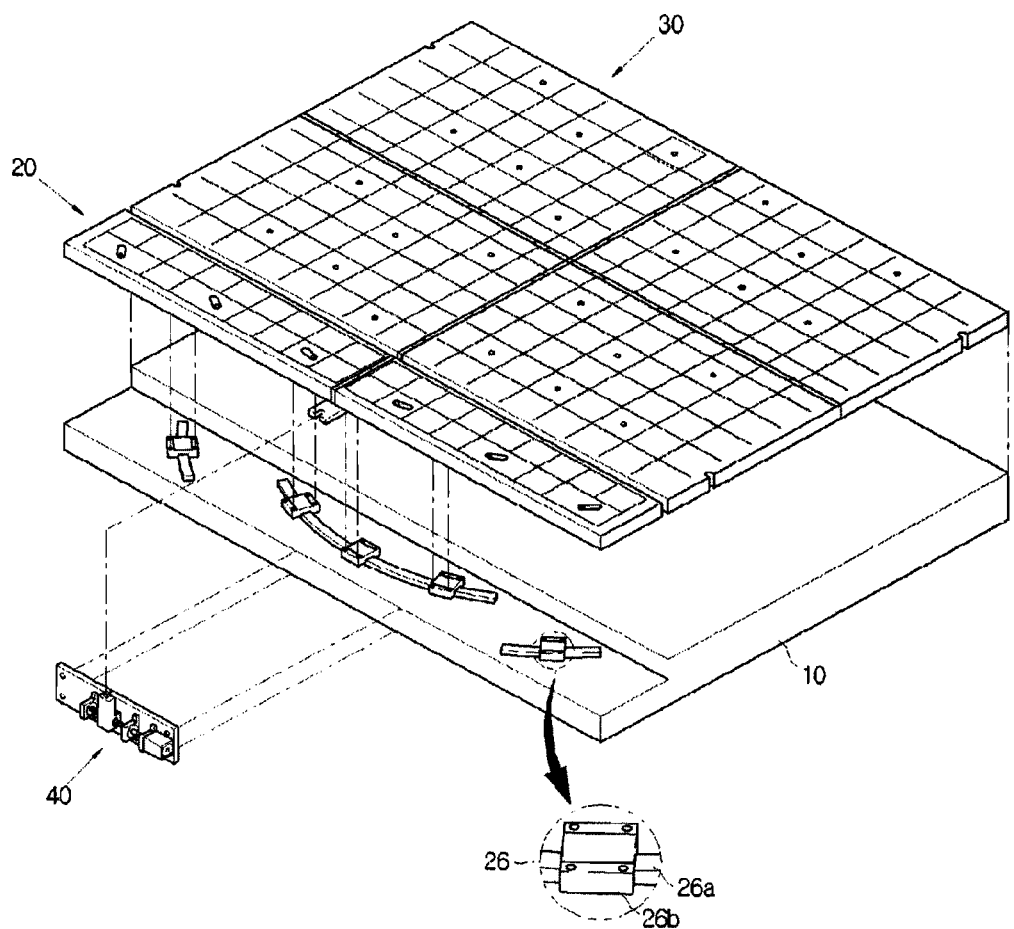
FIG. 4 is an exploded perspective view of a substrate support apparatus according to the present invention.

FIG. 4 is an exploded perspective view of a substrate support apparatus according to the present invention. As shown in FIG. 4, the substrate support apparatus according to the present invention includes a base 10, a movable stage 20, a fixed stage 30, and a driving means 40.

The base 10 has a rigid structure combined with a steel lattice. The base 10 includes a surface plate and an anti-vibration unit (not shown) positioned therein to absorb vibration. Preferably, a granite surface plate is used, which has a thermal expansion ratio smaller than that of metal (e.g. steel), and which is made of high-strength granite so that it can endure heat or external impact that may occur during the processes.

Figure 5:
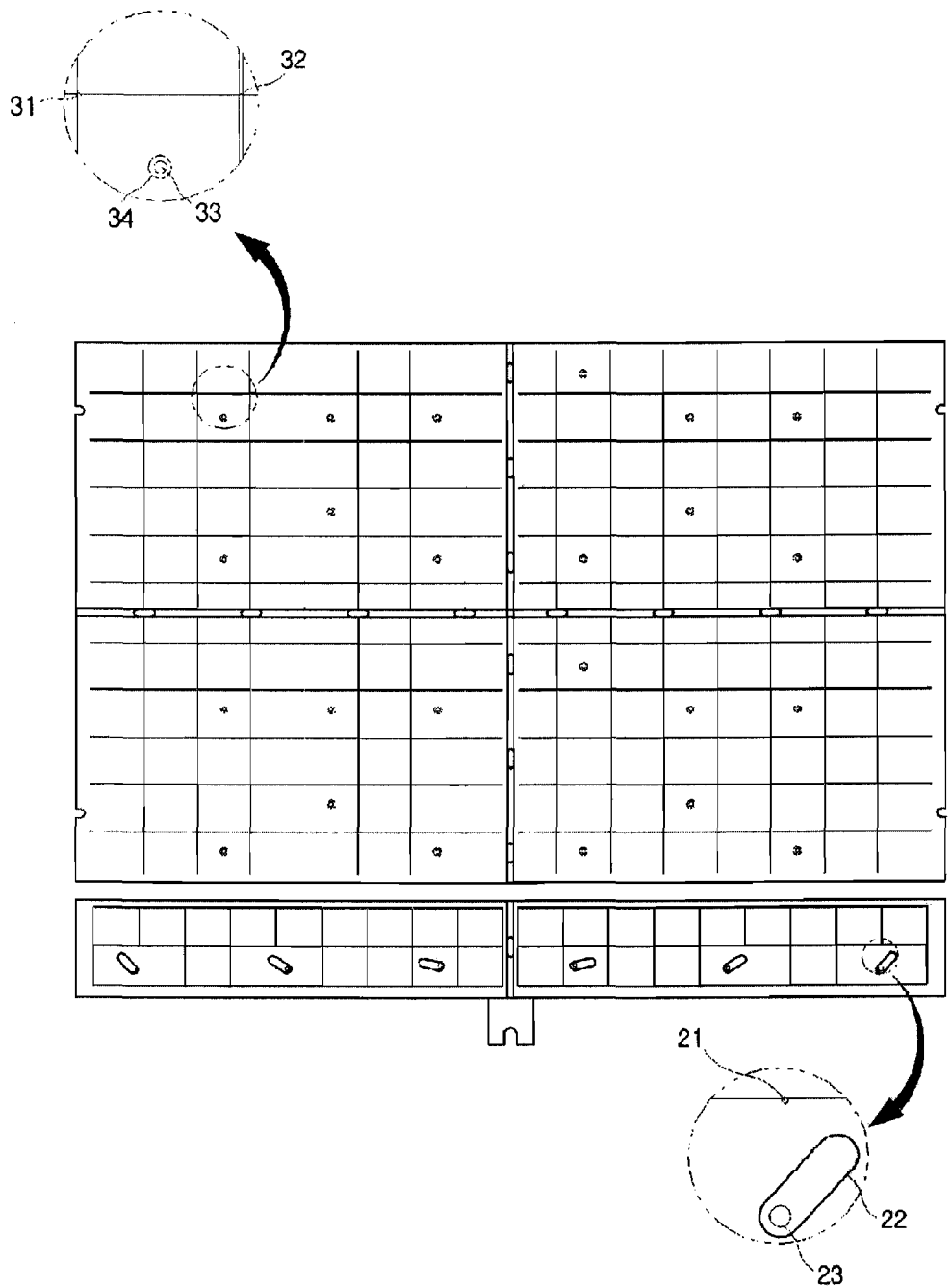
FIG. 5 is a top view of movable and fixed stages according to the present invention.

FIG. 5 is a top view of the movable and fixed stages.

As shown in FIG. 5, the movable stage 20, on which a substrate (not shown) is seated, is coupled to the upper surface of the base 10, and is adapted to rotate by a predetermined angle. The movable stage 20 has drawing nozzles 31 installed therein to draw the upper surface of the substrate.

The movable stage 20 has a number of pin holes 22 formed on its upper surface and elongated in the same direction as the direction of rotation so that, when the movable stage 20 rotates, the pin holes 22 guide pins 23 installed on the bottom surface. The pins 23 are adapted to move up and down so that, when the substrate is loaded onto the apparatus, the robot arm can position the substrate at the alignment point and then recede.

The movable stage 20 has a protrusion 24 installed on the bottom surface of its center to receive the sliding roller of the driving means (described later). The protrusion 24 has an insertion groove 25 elongated in a direction. This prevents the sliding roller from escaping when the movable stage 20 rotates, and facilitates the rotation.

Three guides 26 are positioned as R guides between the base 10 and the movable stage 20 to guide the rotation of the movable stage 20. Each R guide includes an arc-shaped R rail 26a and an R block 26b adapted to move along the R rail 26a.

Preferably, at least one R guide is installed so that the rotation of the movable stage 20 can be adjusted meticulously. In addition, the R rails 26a of all three guides 26 have a common center so that the movable stage 20 can rotate stably.

The fixed stage 30 is coupled to the upper surface of the base 10, and is spaced from the movable stage 20 to secure a space for rotation of the movable stage 20 and to prevent it from colliding with the fixed stage 30 during rotation.

The fixed stage 30 is provided with floating nozzles 31 for ejecting air upward and drawing nozzles 32 for drawing air downward. Particularly, the floating nozzles 31 eject air in the upward direction so that the substrate can float while it is loaded onto the apparatus and aligned. After the alignment, the drawing nozzles 32 draw air so that the substrate is attached to the upper surface of the fixed stage 30.

Although it has been assumed in the above description of the present embodiment that the floating nozzles 31 and the drawing nozzles 32 are separate from each other, it is also possible to employ nozzles capable of both drawing and ejecting air.

The fixed stage 30 has pin holes 34 formed in a number of regions to receive the pins 33 when they rise from below, as in the case of the movable stage 20. However, the pin holes 34 are not necessarily elongated, because the fixed stage 30 does not rotate.

Figure 6:
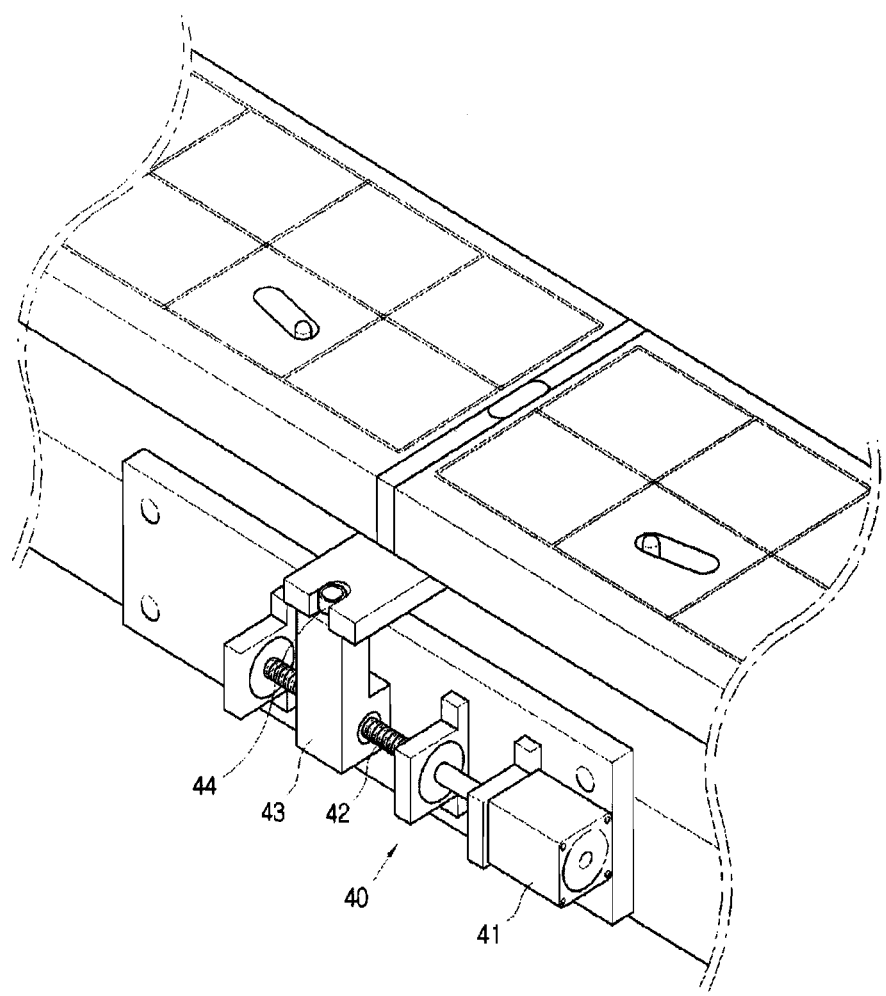
FIG. 6 is an enlarged perspective view of a driving means according to the present invention.

FIG. 6 is an enlarged perspective view of a driving means according to the present invention.

As shown in FIG. 6, the driving means 40 is coupled to the front surface of the base 10. The driving means 40 includes a driving motor 41, a feed shaft 42 adapted to transmit rotational force from the driving motor 41 and provided with a screw thread, a movable body 43 coupled to the feed shaft 42 and adapted to move along the screw thread when the feed shaft 42 rotates, and a sliding roller 44 coupled to the top of the movable body 43 and adapted to rotate idly. The sliding roller 44 is received in the above-mentioned insertion groove 25 of the protrusion 24, and is adapted to transmit force, which results from the linear movement of the movable body 43 by the driving force from the driving motor 41, to the protrusion 24.

The function and operation of the substrate support apparatus according to the present invention will now be described.

Figure 7:
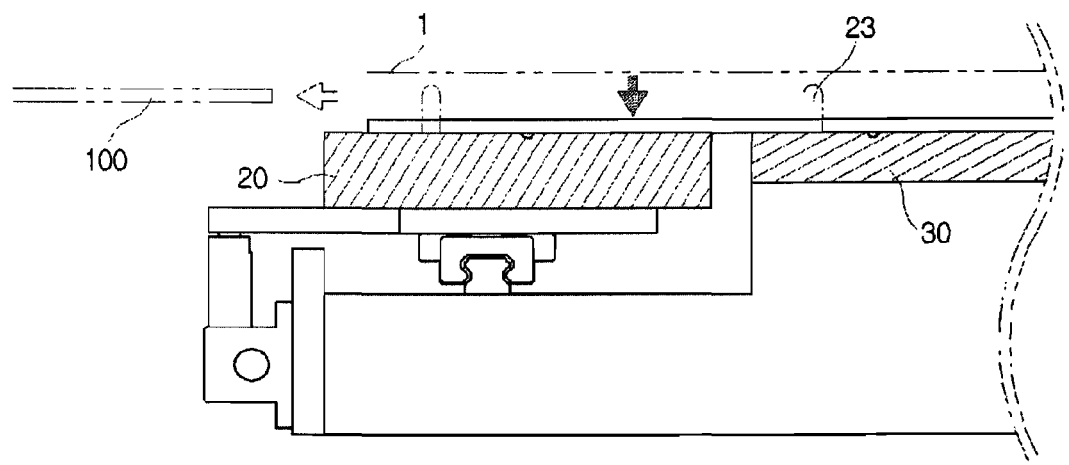
FIGS. 7 to 9 show the operation of the substrate support apparatus according to the present invention.
Figure 8:
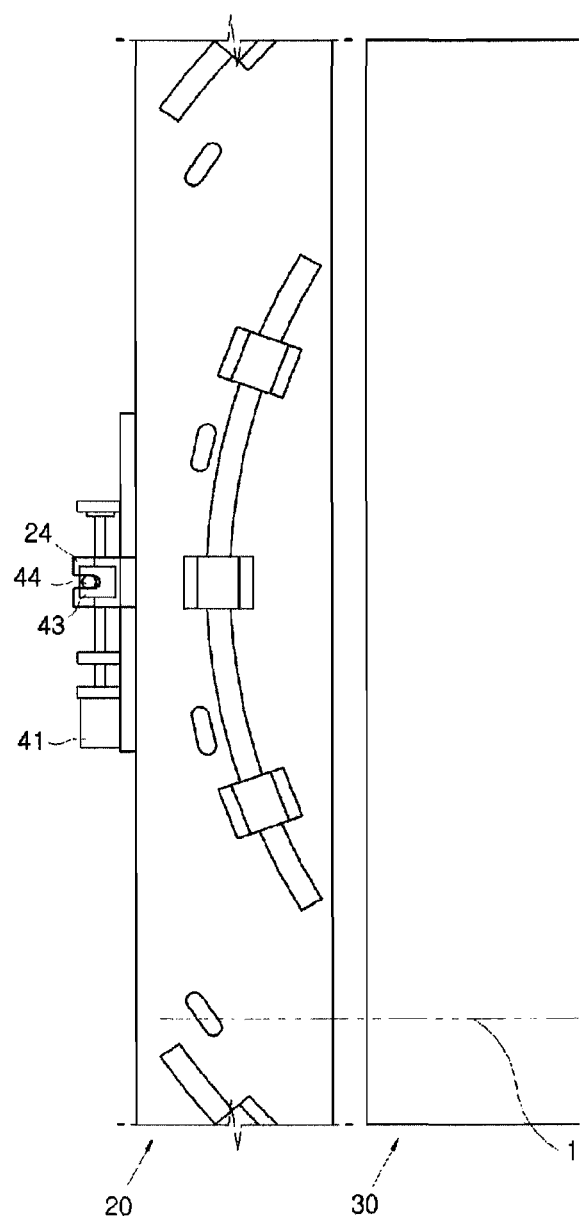
Figure 9:
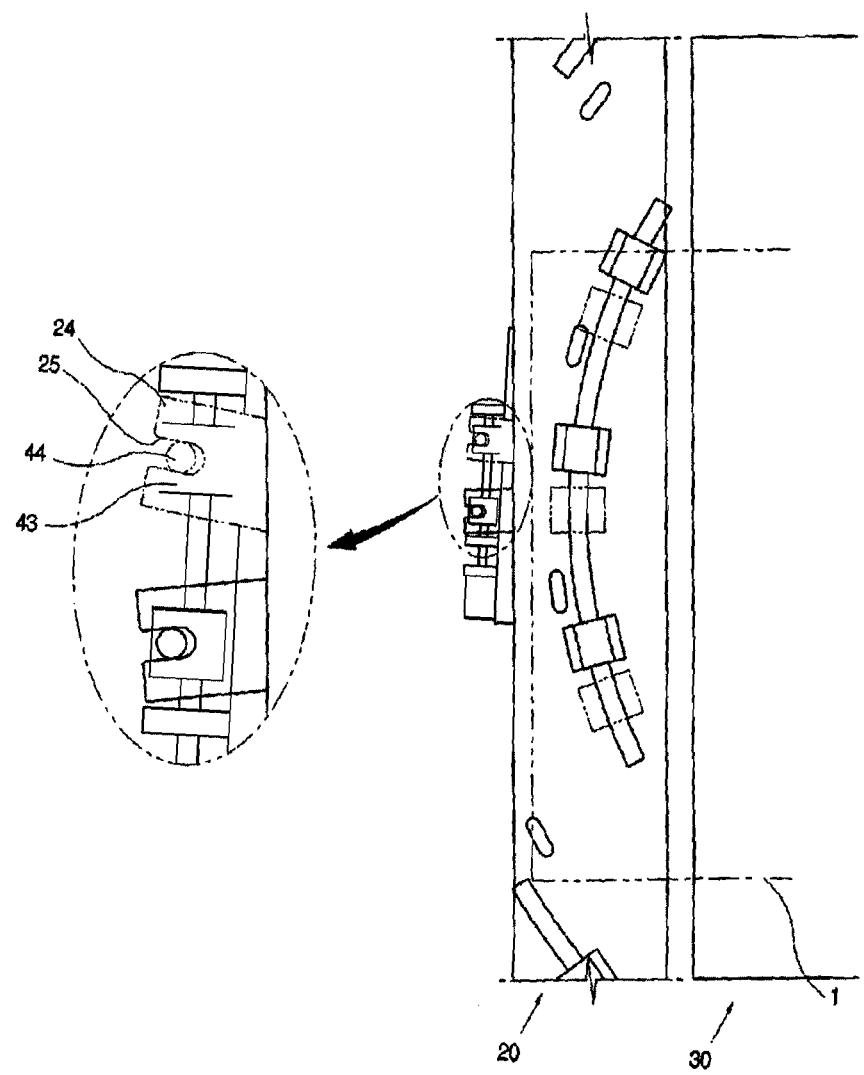

FIGS. 7 to 9 show the operation of the substrate support apparatus according to the present invention. As shown in FIG. 7, the robot arm 100 seats the substrate 1 on the pins 23 and 33, which protrude from the top of the movable and fixed stages 20 and 30, and then returns to its original position.

The pins 23 and 33 then descend so that the substrate 1 is seated on the upper surface of the movable and fixed stages 20 and 30. The drawing nozzles 21 of the movable stage 20 draws air to attach the substrate 1 to the upper surface of the movable stage 20, and the floating nozzles 31 of the fixed stage 30 eject air upward and cause the substrate 1 to float so that the entire substrate is rotated simply by rotating the movable stage 20.

As shown in FIGS. 8 and 9, the driving motor 41 moves the movable body 43, and the force resulting from the linear movement of the movable body 43 is transmitted to the protrusion 24 via the sliding roller 44 coupled to the top. The insertion groove 25 of the protrusion 24 receives the sliding roller 44, and the sliding friction between the inner surface of the insertion groove 25 and the outer surface of the sliding roller 44 transmits the force. The fact that the insertion groove 25 is elongated in a direction guarantees that the sliding roller 44 transmits constant force without escaping from the insertion groove 25.

The protrusion 24 is coupled to the movable stage 20, which is coupled to the guides 26 installed on the bottom surface so that, when force is applied in a direction, the protrusion 24 and the movable stage 20 do not translate as a whole, but are guided by the guides 26 to rotate. This type of rotation of the movable stage 20 is followed by rotation of the substrate 1, which is attached to its upper surface.

After the substrate 1 has been aligned and positioned at the alignment point for the corresponding process in this manner, the drawing nozzles of the fixed stage 30 are actuated so that the substrate 1 is completely attached to the upper surface of the fixed stage 30 for following examination and repair processes.

Figure 10:
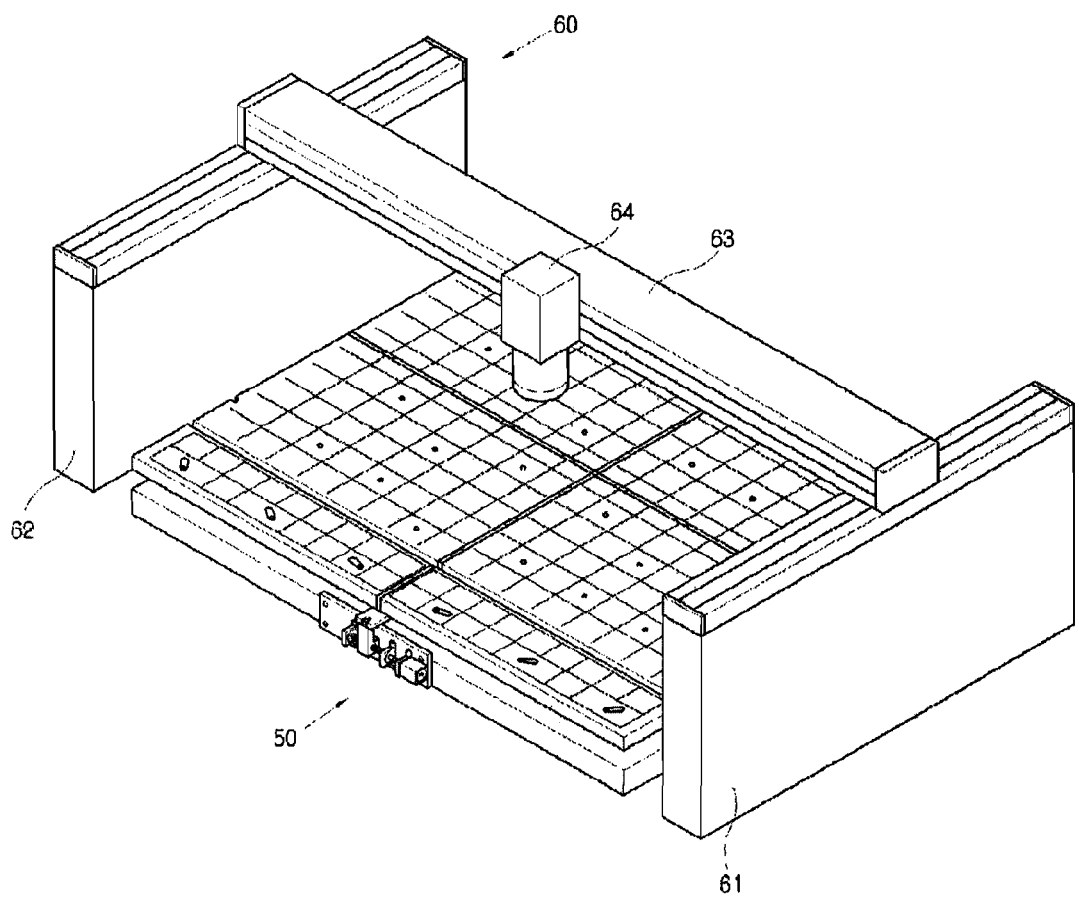
FIG. 10 is a perspective view of an apparatus for examining the seal pattern of an LCD cell, which incorporates the substrate support apparatus according to the present invention.

According to another aspect of the present invention, the present invention provides an apparatus for examining an LCD cell, which incorporate the above-mentioned substrate support apparatus. FIG. 10 is a perspective view briefly showing the examination apparatus according to the present invention. As shown in FIG. 10, the LCD cell examination apparatus includes a substrate support apparatus 50 and a gantry unit 60, which includes two support platforms 61 and 62 positioned on both sides of the substrate support apparatus 50 and a bridge 63 connecting both support platforms.

The gantry unit 60 has a rail-type linear guide and a motor. A correction device 64 is coupled to the bridge 63 to examine and repair a substrate loaded on top of the substrate support apparatus 50.

When an LCD cell having a seal pattern formed thereon is loaded on top of the substrate support apparatus 50 of the LCD cell examination apparatus, the substrate support apparatus 50 is actuated to align the LCD cell so that it corresponds to the point of initial examination by the correction device 64 according to the above-mentioned method. The correction device 64 of the gantry unit 60 then examines the seal pattern and repairs any defective region.

Although several exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

The substrate support apparatus according to the present invention and the apparatus for examining the seal pattern of an LCD cell by using the same are advantageous in that a substrate can be easily aligned by using separate stages, on which the substrate can be seated. The alignment of a substrate by using separate stages alone consumes a small amount of power.

In addition, the separate stages are moved by a dedicated power source. This simplifies the structure for aligning substrates. The separate stages alone are adjusted to align a substrate for a short period of time. This reduces the overall process time.

The invention claimed is:

1. A substrate support apparatus for seating and supporting a substrate during a process, the substrate support apparatus comprising:
   a movable stage provided with first drawing nozzles for attaching an area of a substrate to an upper surface of the movable stage and which is configured to rotate by a predetermined angle around a vertical axis so as to align the substrate using the one area of the substrate attached;
   a fixed stage spaced from the movable stage and provided with floating nozzles for ejecting air upward and floating the substrate while supporting another area of the substrate and second drawing nozzles for drawing air downward and fixing the aligned substrate;
   and a driver, coupled to the movable stage, which rotates the movable stage,
wherein with the one area of the substrate attached and fixed to the movable stage and the another area of the substrate spaced from the fixed stage by a predetermined distance and floated, as the movable stage rotates, the another area of the substrate rotates and is aligned, and when the another area of the aligned substrate is attached and fixed to the fixed stage by the second drawing nozzles, the substrate is fixed.

2. The substrate support apparatus as claimed in claim 1, wherein the driver comprises a driving motor, a feed shaft coupled to the driving motor, a movable body coupled to the feed shaft and adapted to move in a longitudinal direction of the feed shaft, and a sliding roller coupled to the movable body, and the movable stage comprises a protrusion having an insertion groove formed to receive the sliding roller.

3. The substrate support apparatus as claimed in claim 1, wherein the movable stage comprises a guide positioned on a bottom surface to guide rotation of the movable stage.

4. An apparatus for examining a seal pattern of a liquid crystal display (LCD) cell, the apparatus comprising:
   a substrate support apparatus comprising a movable stage provided with first drawing nozzles for attaching an area of a substrate to an upper surface of the movable stage and which is configured to rotate by a predetermined angle around a vertical axis so as to align the substrate using the one area of the substrate attached;
   a fixed stage spaced from the movable stage and provided with floating nozzles for ejecting air upward and floating the substrate while supporting another area of the substrate and second drawing nozzles for drawing air downward and fixing the aligned substrate;
   a driver, coupled to the movable stage, which rotates the movable stage; and
   a gantry unit comprising support platforms positioned on both sides of the substrate support apparatus, a bridge positioned above the substrate support apparatus to connect the support platforms, and a corrector, coupled to the bridge, which examines and repairs a seal pattern of the substrate,
   wherein with the one area of the substrate attached and fixed to the movable stage and the another area of the substrate spaced from the fixed stage by a predetermined distance and floated, as the movable stage rotates, the another area of the substrate rotates and is aligned, and when the another area of the aligned substrate is attached and fixed to the fixed stage by the second drawing nozzles, the substrate is fixed.

* * * * *